Patented Mar. 18, 1952

2,589,245

UNITED STATES PATENT OFFICE 2,589,245

AMIDE-EPOXIDE COMPOSITIONS, ETC.

Sylvan Owen Greenlee, Louisville, Ky., assignor to Devoe & Raynolds Company, Inc., Louisville, Ky., a corporation of New York No Drawing. Application December 3, 1945, Serial No. 632,595

7 Claims. (Cl. 260—47)

This invention relates to new complex amide-epoxide compositions, and more particularly to such compositions capable of conversion into insoluble, infusible products, and valuable for use in making varnishes and protective coatings, in making molding compositions and articles, as adhesives, and in making films and fibres, etc. The invention includes various new amide-epoxy compositions and reaction products and articles and products made therefrom.

The new amide-epoxy compositions and products are made by reacting amides with complex epoxides produced by the reaction of polyhydric phenols with polyfunctional halohydrins or with polyepoxides to form complex reaction products containing terminal epoxide groups. Such epoxide products with which the amides are reacted are advantageously complex polymeric products resulting from the reaction of polyhydric phenols with polyfunctional halohydrins or polyepoxides in proportions to give terminal epoxide groups in the polymeric reaction products. Such complex epoxide products and compositions are described in my companion applications Serial Nos. 617,176, 621,856, both now abandoned, and 626,449.

One of the objects of the present invention is the production of infusible and insoluble reaction products of complex epoxides and amides in suitable proportions which have remarkable chemical resistance combined with hardness, toughness, flexibility, lack of contraction on conversion, and other desirable properties.

Another object of the invention is the production of amide-epoxide compositions capable of use as raw materials for the production of such conversion products.

Another object of the invention is the production of amide-epoxide compositions which on conversion result in cross-linking of the complex epoxides through reaction of active hydrogens of amides with epoxide groups.

Another object of the invention is the production of fusible amide-epoxy compositions and reaction products useful for various purposes and still containing epoxy groups capable of further reaction.

Another object of the invention is the production of compositions and reaction products of polyepoxides with amides in proportions giving final infusible products of remarkable chemical resistivity and other desirable properties.

Another object of the invention is the production of compositions and reaction products of complex epoxides with amino-amides containing both amide and amine groups.

Another object of the invention is the production of compositions and reaction products of complex epoxides with amides and amino-amides of higher unsaturated fatty acids.

Another object of the invention is the production of solutions of such amide-epoxy compositions for use in making varnishes and protective coatings, impregnating solutions, films, filaments, etc.

Another object of the invention is the production of molding mixtures and compositions capable of conversion into infusible, molded articles and products, and the articles and products so produced.

Other objects of the invention and the nature and advantages of the invention will further appear from the following more detailed description.

In my companion application Serial No. 617,176, I have described complex, polymeric reaction products of polyhydric phenols with polyfunctional halohydrins such as epichlorhydrin and glycerol dichlorhydrin, with the difunctional chlorhydrin used in proportions in excess of that equivalent to the polyhydric phenol and less than twice the equivalent amount, by carrying out the reaction with the addition of caustic alkali equal to or somewhat in excess of the amount required to combine with the halogen of the halohydrin and giving complex, polymeric products containing both terminal epoxy groups and terminal primary hydroxyl groups, and with the epoxy groups in general considerably in excess of the terminal primary hydroxy groups. Such complex, polymeric epoxy-hydroxy products and compositions are advantageously used for reaction with amides to form the new amide epoxy compositions and products of the present invention.

In my companion application Serial No. 621,856, I have described epoxy-hydroxy compositions resulting from the reaction of a polyhydric phenol with a polyfunctional halohydrin such as epichlorhydrin in approximate proportions of 2 mols of epichlorhydrin to one of dihydric phenol to give resinous products containing both terminal epoxy and hydroxy groups with the proportion of terminal epoxy groups considerably in excess of the terminal hydroxy groups. Such epoxy-hydroxy compositions are also advantageously used in forming the new amide-epoxy compositions and products of the present invention.

In my companion application Serial No. 626,449, I have described new polyepoxy products and compositions obtained by the direct addition of polyhydric phenols with polyepoxides and with the proportion of polyepoxides reacting with the polyhydric phenols in excess of the equivalent amount so that the resulting reaction products will contain terminal epoxy groups. Such polyepoxy reaction products, and particularly complex, polymeric, polyepoxy reaction products, are advantageously used in making the new amide-epoxy compositions and products of the present invention. Such complex epoxides are polymeric polyethers of polyhydric phenols and particularly of dihydric phenols having alternating phenol residues and aliphatic groups, including hydroxyl-containing intermediate aliphatic groups and epoxide-containing terminal aliphatic groups and in general are free from functional groups other than hydroxyl and epoxide groups.

Various amides, and particularly primary carboxylic acids amides and polyfunctional carboxylic acids amides, are useful in making the new amide epoxy compositions and products. Apparently all hydrogens directly attached to nitrogen are active hydrogens in reacting with epoxide groups. The polyamides are more active with the epoxide groups than are the monoamides and in many cases no catalyst is required to promote reaction of the epoxides with the polyamides. With most amides, especially the monoamides, it is advantageous to use a catalyst, particularly if high molecular weight infusible products are desired. Alkaline and Friedel-Crafts type catalyst have been found to be especially active in promoting the reaction of the epoxide groups with amides.

In general, carboxylic acids amides containing at least two active hydrogens per molecule which are directly attached to nitrogen are satisfactory materials, when used in suitable proportion, for preparing infusible products in the practice of the invention. Amides containing one hydrogen per molecule which is directly attached to nitrogen are in general satisfactory for preparing fusible amide-epoxy products and compositions while amides containing more than one active hydrogen per molecule directly attached to nitrogen can be used to form fusible amide-epoxide compositions and reaction products if used in limited amounts.

Polyamides are particularly advantageous. Thus in the case of polyamides such as the diamides derived from dibasic carboxylic acids, e. g. adipamide, a number of active hydrogens are provided by the different amide groups which are separated by one or more carbon atoms so that they may readily react with a number of epoxide groups with resulting cross-linking to give complex amide-epoxy reaction products.

Polyamides derived by the amidification of ethylene diamine and polyethylene polyamines having two primary amino groups with organic carboxylic acids including resin acids (e. g. abietic acid) and the acids derived from fats and oils are also advantageously reacted with the complex epoxides to give valuable amide-epoxide reaction products. Such polyamides, when made from resin acids and higher unsaturated fatty acids impart modified properties to the compositions made therewith, due to the modifying action of the high molecular weight acids used. Thus polyamides of drying oil acids, such as linseed oil acids, may impart desirable drying properties to compositions made therewith.

Similarly, monoamides of high molecular weight acids such as resin acids and drying oil acids, etc., may impart modified or drying properties to the compositions made therewith.

The carboxylic acid amides above referred to and illustrated in the examples are monocarboxyl acid amides of ammonia or of an aliphatic polyamine having two primary groups (Examples XVII to XX, XXII, XXIII, XXVI, and XXVIII) or polycarboxyl acid amides having hydrogen linked directly to the nitrogen of the amide groups (Examples XXI, XXIV, XXV and XXVII).

Fusible amide-epoxy reaction products can be prepared with monofunctional amides or with limited amounts of polyfunctional amides under proper reaction conditions. The maximum complexity of amide-epoxy reaction products appears to be obtained when polyfunctional amides, such as primary amides and polyamides, are used with the complex epoxides in proportions close to the equivalent amounts. Complexity of the products appears to decrease as more or less than the equivalent amounts of amides are used but infusible products can nevertheless be obtained with more or less than the equivalent amount of the amides in many cases. Thus with some of the amides, particularly polyamides, it is possible to obtain infusible products with considerably less than equivalent amounts of the amides, as well as with more than the equivalent amount, probably due to the fact that the complex epoxides are relatively high in molecular weight and the amount of coupling necessary to make them infusible is relatively small.

The complexity of the final products may also be controlled to some extent otherwise than by adjusting the ratio of amide and epoxy reactants, as by using moderate reaction conditions such as lower temperatures or shorter reaction periods or by using no catalyst, to give fusible products which are valuable intermediate products and which may, if the amide and epoxy are only partially reacted and are in proper proportions for further reaction, give infusible products when subjected to such further reaction or conversion.

The complex epoxide compositions used with the amides are themselves capable of polymerization by reaction of epoxy groups with hydroxyl groups, particularly in the presence of small amounts of a catalyst. The complex epoxy compositions made from polyhydric phenols and epichlorhydrin contain both terminal epoxy groups and terminal primary hydroxyl groups and, in general, the number of terminal epoxy groups is considerably in excess of the number of terminal primary hydroxyl groups. In polymeric products containing intermediate hydroxyl groups, the total number of hydroxyl groups may be considerably in excess of the number of epoxy groups. Polymerization of such complex epoxy-hydroxy compounds may take place through terminal epoxy and primary hydroxy groups to form long chain polymers or through terminal epoxy groups and intermediate hydroxyl groups to form polydimensional polymers.

In the case of polyepoxides made by the direct reaction of bis phenol with an excess of polyepoxide there will also be hydroxyl groups, and, in the case of polymeric products, the number of hydroxyl groups may be in excess of the terminal epoxy groups. Such products are capable of polymerization by reaction of terminal epoxide groups with intermediate hydroxyl groups to form complex, polydimensional polymers, particularly when a catalyst is used.

When such complex epoxide compositions are reacted with amides, particularly when catalysts are used, the action may be one of the direct addition through epoxide groups and it may be in part the reaction of epoxy and hydroxyl groups to form ether linkages, particularly where the amide is used in less than equivalent proportion such that there is insufficient amide to react with all of the epoxide groups.

The complex epoxide compositions which are reacted with the amides are resinous products which can be made of varying melting points, epoxide content, and degree of polymerization from soft resins to harder resins of higher melting point. In general, these resins are soluble, unless too highly polymerized, in solvents such as acetone, methyl ethyl ketone, diacetone alcohol, cyclohexanone, etc. and can be used in solution with the addition of the amides with or without catalyst, as the case may be, in forming liquid compositions for use e. g. in making clear or pigmented varnishes, in making transparent films and filaments, and in impregnating wood, fabrics and other porous material, etc.

The reaction of the amides with such complex epoxides, particularly when polyfunctional amides are used, appears to be one of cross-linking the complex epoxide molecules through reaction of the amides with epoxide groups. But such cross-linking reaction may be combined with a simultaneous polymerization reaction between epoxide and hydroxyl groups, particularly when the amide is used in less than equivalent proportion.

When polyepoxides are reacted with the amides and where the polyepoxides contain only or mainly terminal epoxide groups with intermediate hydroxyl groups, the action of the amides, and particularly of the more complex polyfunctional amides, is such that considerably less than the equivalent amount of amide will react with the polyepoxide to form infusible products; while the epoxide groups which are present in excess of those reacting with the amide may react to a greater or less extent with hydroxyl groups, in which case the complex epoxy-amide reaction product may have the polyepoxides united in part through amide cross-linking and in part through epoxy-hydroxide reaction to form ether linkages.

Similarly in the case of the complex polymeric epoxides which also contain terminal hydroxyl groups, the final hardening operation, particularly when less than the equivalent amount of amide is used, may be in part cross-linking through the amides and in part by polymerization through epoxy-hydroxy reactions to form ether linkages.

The complex epoxides and polyepoxides used for reacting with the amides may themselves be carried to a high degree of polymerization in which case only a small amount of amide may be necessary to convert the highly polymerized epoxides into an infusible state. With products of lower melting point and lower degree of polymerization an increased amount of cross-linking or polymerization in the presence of the amide, or a large proportion of amide, may be necessary to give the final insoluble product.

In referring to equivalent amounts of amide and of the complex polyepoxides, each active hydrogen attached to nitrogen of the amide is considered equivalent to one epoxide group. The equivalent weight of the amide is the weight which will contain one such active amide hydrogen when used with an equivalent weight of the complex epoxides containing one epoxide group. Thus with a primary monoamide having two active amido hydrogens, the equivalent weight is one-half the molecular weight when used with the weight of the polyepoxides equivalent to one epoxide group.

In referring to equivalent amounts of amides, or to less than equivalent amounts, in the following examples, the amounts are those used with the complex epoxides, and it is not intended to mean that the amount used is completely reacted. While theoretically complete reaction might take place it is probable that the reaction is a partial and incomplete reaction between part of the active hydrogens of the amides and the epoxide groups.

The epoxide equivalent of the complex epoxides used can be determined for practical purposes by determining the equivalent weight of the composition per epoxide group.

The epoxide content of the epoxide-hydroxy compositions hereinafter indicated were determined by heating a 1 gram sample of the epoxide composition with an excess of pyridine hydrochloride (made by adding 16 cc. of concentrated hydrochloric acid per liter of pyridine) at the boiling point for 20 minutes and back titrating the excess pyridine-hydrochloride with 0.1N sodium hydroxide using phenolphthalein as indicator, and considering the 1 HCl is equal to 1 epoxide group.

The following table gives illustrative examples of hydroxy-epoxy compositions resulting from the reaction of bis phenol with varying proportions of epichlorhydrin with the use of caustic soda according to said companion applications, the table giving the softening points of the resin, the equivalent weight to epoxide as determined by the above method, and the average molecular weight, in the case of the lower melting resins, as determined by the boiling point method.

| Example | Softening Point (Durrans Mercury Method) | Equivalent weight to Epoxide | Average Molecular Weight |
|---|---|---|---|
| | ° C. | | |
| I | 43 | 325 | 451 |
| II | 84 | 591.5 | 791 |
| III | 90 | 730 | 807 |
| IV | 100 | 860 | 1,133 |
| V | 121 | 1,248 | |
| VI | 132 | 1,158 | |
| VII | 146 | 3,155 | |

The complex epoxides in this table were made from the reaction of bis phenol and epichlorhydrin in varying proportions with the use of aqueous caustic alkali sufficient to combine with all of the chlorine of the epichlorhydrin or somewhat in excess thereof. Other complex epoxides can similarly be made from other polyhydric phenols which are similarly capable of reacting with amides although the properties of the different complex epoxides will vary somewhat with different polyhydric phenols used and with different proportions of phenol and epichlorhydrin and with different degrees of polymerization.

*Example VIII*

A complex epoxide was prepared from 6 mols of hydroquinone and 7 mols of epichlorhydrin with 7.5 mols of aqueous caustic soda, which had a softening point of 92° C. and an equivalent weight to epoxide of 1105.

*Example IX*

An epoxide composition was prepared from 6 mols of resorcinol and 7 mols of epichlorhydrin with 7.76 mols of aqueous sodium hydroxide, which had a softening point of 80° C. and an equivalent weight to epoxide of 1146.

The foregoing examples illustrate complex epoxy-hydroxy compositions such as are described in my companion applications Serial Nos. 617,176 and 621,856. Likewise, complex epoxides may be prepared from the further reaction of such complex epoxy-hydroxy compounds with polyhydric phenols used in amounts less than that which is equivalent to the epoxide content. Thus the complex epoxides of Examples I to IX can be further reacted with limited amounts of polyhydric phenols to give complex epoxides of higher molecular weight which are useful in reactions with amides according to the present invention, such further reaction products being described in said companion applications.

The complex epoxides which are useful for reaction with amides also include complex polyepoxides such as are described in my companion application Serial No. 626,449 made by reacting polyhydric phenols with simpler polyepoxides to give complex polyepoxides. The simpler polyepoxides used for reacting with polyhydric phenols and amides include new polyepoxides more particularly described in Examples I and II of said companion application Serial No. 626,449 and which are briefly described in Examples X and XI.

*Example X*

The polyepoxide is produced by reacting 3 mols of glycerine with 9 mols of epichlorhydrin using boron trifluoride as a condensing agent and finally treating the resulting reaction product with sodium aluminate to give a polyepoxide in the form of a pale yellow product having an epoxide equivalent of 149 and an average molecular weight as determined by the standard boiling point elevation method of 324, representing an average of 2.175 epoxide groups per molecule, assuming the determined molecular weight is the molecular weight.

*Example XI*

A polyepoxide composition is similarly prepared from 1 mol of trimethylol propane and 3 mols of epichlorhydrin condensed with boron trifluoride and finally treated with sodium aluminate to give a pale yellow liquid having an equivalent weight to epoxide of 151 and an average molecular weight of 292.2, corresponding to approximately 1.94 epoxide groups per molecule, assuming an average molecular weight.

Other new polyepoxy products can similarly be made from other polyhydric alcohols containing 3 or more hydroxyl groups as described in said companion application Serial No. 626,449.

The preparation of new complex epoxides by the reaction of simpler polyepoxides with polyhydric phenols is illustrated by the following Examples XII to XVI.

*Example XII*

An epoxide composition was prepared by heating 0.3 mol of diglycid ether with 0.2 mol of bis phenol at 190–215° C. for 1½ hours to give a product softening at 89° C. and having an equivalent to epoxide of 1460.

*Example XIII*

To 29.8 parts of the product of Example X was added 11.4 parts of bis phenol and this mixture was heated gradually to 173° C. and held at 162–173° C. for 2 hours. The resulting product was a viscous, tacky syrup having an epoxide equivalent of 479.

*Example XIV*

To 4.6 parts of bis phenol and 4.3 parts of diglycid ether was added 0.032 part of 20% sodium hydroxide and the resulting mixture heated for 45 minutes at 100° C. to give a semisolid material containing one epoxide group per 371 parts.

*Example XV*

To 7.5 parts of p,p'-dihydroxy diphenyl sulfone and 7.5 parts of diglycid ether was added 0.006 part of sodium hydroxide and the resulting mixture was heated for 86 minutes at 100° C. to give a product containing 1 epoxide group per 315 parts.

*Example XVI*

To 50 parts of the product of Example XI was added 19 parts of bis phenol and the resulting mixture was heated for 2 hours and 10 minutes at 162 to 186° C. to give a soft tacky resin having an epoxide equivalent of 440 and a molecular weight of 828.

The foregoing Examples I to XVI, inclusive, illustrate various complex epoxides which can be reacted with amides in making the new amide-epoxy compositions. The following examples illustrate the production of such compositions from the complex epoxides of the foregoing examples.

*Example XVII*

With the resin of Example I, a product softening at 86° C. was obtained with 1.1 equivalent of acetamide (33 parts per 325 parts of the resin) when heated for 3 hours at 200° C.

*Example XVIII*

With 591.5 parts of the resin of Example II a product softening at 119° C. was obtained when heated for 3 hours at 200° C. with 61 parts of benzamide.

*Example XIX*

An infusible product was obtained by heating 1.1 parts of acetamide, 24.3 parts of the resin of Example III with 0.12 part of sodium phenoxide for 15 minutes at 150° C.

*Example XX*

An infusible product was obtained by heating 215 parts of the product of Example IV with 14.6 parts of benzamide and 2.15 parts of sodium hydroxide for 15 minutes at 150° C.

*Example XXI*

An infusible product was obtained by heating 1248 parts of the resin of Example V with 72 parts of adipamide and 12.5 parts of potassium hydroxide at 150° C. for 15 minutes.

*Example XXII*

An infusible product was obtained by heating 3155 parts of the product of Example VII with 100 parts of the diacetamide of hexamethylenediamine with 15 parts of potassium hydroxide for 10 minutes at 150° C.

*Example XXIII*

An amide was prepared from 3 mols of linseed oil acids and 1 mol of diethylene triamine. To 300 parts of this amide was added 1107 parts of the complex epoxide of Example VIII and 10 parts of potassium hydroxide. This mixture was heated for ½ hour at 100° C.

A portion of this product was dissolved in methyl isobutyl ketone to give a 50% solution. Films of .003 inch thickness when baked for ½ hour at 150° C. gave infusible films.

*Example XXIV*

An infusible product was obtained by heating 1460 parts of the product of Example XII with 72 parts of adipamide and 7.3 parts of sodium hydroxide at 200° C. for ½ hour.

*Example XXV*

An infusible product was obtained by heating 479 parts of the product of Example XIII with 36 parts of adipamide and 2 parts of KOH at 110° C. for 25 minutes.

*Example XXVI*

To 371 parts of the product of Example XIV was added 140 parts of an amide derived from ammonia and soy bean oil acids and 18.5 parts of sodium phenoxide.

A portion of this mixture was dissolved in cyclohexanone to give a 75% solution. Thin films spread from this solution and baked for 1 hour at 150° C. gave a flexible film.

Another portion of this mixture when heated for 1 hour in a molding form gave a hard insoluble product.

*Example XXVII*

A mixture of 730 parts of the resin of Example III and 72 parts of adipamide was dissolved in cyclohexanone to give 75% solids. To this solution was added 8.26 parts of lamp black, 9.56 parts of a lemon yellow ferric hydroxide, 1.8 parts of a red ferric oxide and 248 parts of rutile titanium dioxide. The resulting mixture was ground in a steel ball mill to give a gray enamel. To this enamel was added 5 parts of potassium hydroxide. Thin films spread from this enamel have flexible films when allowed to air dry over night or when baked for ½ hour at 150° C.

*Example XXVIII*

A mixture of 1146 parts of the product of Example IX, 350 parts of an amide derived from rosin and ammonia and 50 parts of sodium phenoxide were dissolved in cyclohexanone. Films (0.003 inch thickness) spread from this solution baked for ½ hour at 150° C. gave hard insoluble coatings.

Unlike oleoresinous varnishes and oil modified alkyd resins, the film thickness of protective coatings made from the new amide epoxide compositions is not generally a factor in their conversion. In fact, layers of thickness which would no longer be classified as films, e. g. from one quarter to one half inch, showed no signs of surface dry but convert uniformly throughout the layer. Thus one thick coat of this material may be applied where several thin coats of other types of film-forming compositions would be used.

Where however the amides used are amides of high molecular weight acids such as resin acids and higher unsaturated fatty acids from vegetable and other oils, the products will have somewhat modified properties due to the presence of the acid group in the amides used; and where the acid group is that of a drying oil fatty acid, the resulting compositions may have drying properties.

The new compositions made with amides in suitable proportions thus form valuable protective layers and films when used either as clear varnishes or as pigmented varnishes, giving infusible films of remarkable resistance to chemicals and having other valuable desirable properties.

The new compositions are also valuable for use in making molded objects, where the conversion forms infusible, molded products. They are also valuable for use in impregnating and laminating wood and fabrics, in making self-sustaining films and filaments, etc.

Molded objects and films formed from the infusible products of the present invention have extremely hard, glossy surfaces but, nevertheless, in spite of their extreme hardness, the structure is remarkably tough and flexible. In the past it has been generally recognized that in order to obtain hard films (shellac films being an example) flexibility must be sacrificed; but the insoluble films of the present invention combine hardness with flexibility.

As an indication of the hardness and flexibility of the films made by the reaction of amides with the complex epoxides, extremely hard, infusible films on glass enabled ribbons of indefinite length to be stripped from a film from one to two mils thickness by the use of a sharp knife blade.

In general physical toughness and structure the infusible amide-epoxy resins are comparable to finger nail and horn.

When molded objects are formed by converting a mixture of the epoxy and amide in a mold no contraction has been observed and, in fact, a slight expansion was observed in some cases and reproducible results obtained. While I do not desire to limit myself by any theoretical explanation of the expansion of the resins on hardening, it may be the opening up of the epoxide groups through reaction with amides or the opening up of epoxide groups through reaction with hydroxyl groups to form ether linkages tends to cause separation of the reacting molecules instead of contraction which is characteristic of many condensation and polymerization reactions.

This lack of contraction or slight expansion in the mold is highly valuable for many applications, enabling tight fitting molded articles to be obtained. For example, brushes of many types are made by using a heat converting resin to cement the bristles into the brush ferrule. If the resin contracts during heat conversion the molded material becomes loose fitting in the ferrule. The new epoxide-amide resins and compositions of the present invention give a tight fitting mold within the brush ferrule. Similarly molded inserts can be made which are tight fitting when the composition is hardened in place.

The new infusible epoxide-amide reaction products give extremely glossy films when used as clears or as pigmented enamels. This is highly desirable in the protective coating industry to obtain desired amount of gloss, since it is often impossible to obtain such gloss when known vehicles are used.

The new amide-epoxide compositions may be pigmented with the usual pigments known to the protective coating industry to give enamels. The epoxide may be pigmented either before or after the amide is added.

The new epoxide-amide reaction products have been found to possess an extremely high adherence to glass, metal, wood and other surfaces, and these compositions can be used to advantage in the lamination of glass or metal, in the lamination of wood to form plywood or other laminated wood products, etc.

The new compositions, particularly when used in solution, are valuable impregnating compositions for surface coatings or for impregnating porous and fibrous materials such as fabrics and other porous and fibrous materials. It is one advantage of the new compositions that high concentrations can be used with a limited amount of solvent such that thick coatings are readily applied and the solvent readily removed, the hardening taking place in the film through chemical reaction without the formation of by-products, the chemical reaction being an addition reaction within the epoxy-amide composition itself.

The color stability of the new infusible films has been found to be exceptionally good, both at ordinary temperatures and at higher temperatures.

Many of the new epoxy-amide compositions and reaction products, particularly when converted into the infusible state, present a remarkable combination of desirable properties, including higher resistance to ultraviolet light (minimum ultraviolet absorption); extreme resistance to hydrolysis by water and alkali with very low water permeability or absorption; extreme toughness; speed of drying approaching lacquer of shellac; adhesion to metal, glass and siliceous surfaces; flexibility at sub-zero temperatures; high degree of mar resistance; resistance to chemicals; insolubility to solvents; non-yellowing; ability to stand temperatures up to 400° F. with little or no discoloration; wettability to most pigments; low viscosity at high solids content of solutions; and hardening of thick films through chemical addition reactions within the film itself so that paint and varnish coatings far beyond the usual thickness can be applied.

These remarkable properties and combinations of properties make the new compositions, and products made therefrom, valuable for many practical purposes.

I claim:

1. Amide-epoxy compositions containing in substantial amounts complex resinous epoxides and organic carboxylic acid amides free from reactive groups other than the acid amide groups and having a plurality of active hydrogens on such amide groups, said complex resinous epoxides being polymeric polyethers of dihydric phenols, which dihydric phenols are free from functional groups other than phenolic hydroxyl groups, said resinous epoxides having a plurality of aromatic nuclei alternating with intermediate and terminal aliphatic chains united through ether oxygen, the aromatic nuclei being the hydrocarbon nuclei of the dihydric phenols, the intermediate aliphatic chains being alcoholic-hydroxyl-containing chains free from functional groups other than alcoholic hydroxyl groups and the terminal aliphatic chains having epoxide and alcoholic hydroxyl groups and being free from other functional groups.

2. Amide-epoxy compositions as defined in claim 1, in which the carboxylic acid amides are selected from the group which consists of monocarboxylic acid amides of ammonia and of aliphatic polyamines containing two primary amino groups.

3. Amide-epoxy compositions as defined in claim 1, in which the carboxylic acid amides are polycarboxylic acid amides having hydrogen linked directly to the nitrogen of the amide groups.

4. Amide-epoxy compositions as defined in claim 1 which also contain an alkaline catalyst selected from the group which consists of alkali metal hydroxides and phenoxides.

5. The process of forming complex heat-hardened amide-epoxy reaction products which comprises heating the composition of claim 1 to a high temperature.

6. The process of forming complex heat-hardened amide-epoxy reaction products which comprises heating the composition of claim 1 to a high temperature together with an alkaline catalyst selected from the group which consists of alkali metal hydroxides and phenoxides.

7. Insoluble infusible reaction products resulting from the heating at high temperatures of the amide-epoxy compositions of claim 1.

SYLVAN OWEN GREENLEE.

REFERENCES CITED

The following references are of record in the file of this patent:

UNITED STATES PATENTS

| Number | Name | Date |
|---|---|---|
| 2,213,477 | Steindorff et al. | Sept. 3, 1940 |
| 2,324,483 | Castan | July 20, 1943 |
| 2,444,333 | Castan | June 29, 1948 |

FOREIGN PATENTS

| Number | Country | Date |
|---|---|---|
| 236,594 | Switzerland | July 2, 1945 |